(12) United States Patent
Berthier

(10) Patent No.: US 8,855,838 B2
(45) Date of Patent: Oct. 7, 2014

(54) AUTOMATIC TAKEOFF METHOD FOR AN AIRCRAFT WITH A FLEXIBLE AIRFOIL, AND AIRFOIL AND AIRCRAFT

(75) Inventor: Bernard Berthier, Precy sur Oise (FR)

(73) Assignee: Swissavia SA, Geneva (CH)

( * ) Notice: Subject to any disclaimer, the term of this patent is extended or adjusted under 35 U.S.C. 154(b) by 473 days.

(21) Appl. No.: 13/381,197

(22) PCT Filed: Oct. 28, 2009

(86) PCT No.: PCT/FR2009/052081

§ 371 (c)(1),
(2), (4) Date: Jan. 9, 2012

(87) PCT Pub. No.: WO2010/049647

PCT Pub. Date: May 6, 2010

(65) Prior Publication Data

US 2012/0109427 A1     May 3, 2012

(30) Foreign Application Priority Data

Oct. 30, 2008  (FR) .................................. 08 57404

(51) Int. Cl.
| | |
|---|---|
| *G06F 19/00* | (2011.01) |
| *G05D 1/00* | (2006.01) |
| *G05D 1/08* | (2006.01) |
| *G05D 3/00* | (2006.01) |
| *B64C 39/02* | (2006.01) |
| *B64C 31/036* | (2006.01) |

(52) U.S. Cl.
CPC ......... *B64C 31/036* (2013.01); *B64C 2201/105* (2013.01); *B64C 2201/107* (2013.01); *B64C 39/024* (2013.01)
USPC .............. 701/15; 701/1; 701/3; 701/4; 701/11

(58) Field of Classification Search
CPC ................ B64C 31/036; B64C 39/024; B64C 2201/105; B64C 2201/107; B64C 2201/146; F05B 2240/921
USPC .............. 701/3, 11, 15, 1, 4; 244/138 R, 139, 244/142, 152, 900–904
See application file for complete search history.

(56) References Cited

U.S. PATENT DOCUMENTS

| | | | |
|---|---|---|---|
| 6,808,144 B1 * | 10/2004 | Nicolai et al. | 244/139 |
| 7,770,839 B2 * | 8/2010 | Iwata | 244/38 |

(Continued)

FOREIGN PATENT DOCUMENTS

| | | |
|---|---|---|
| WO | 02070343 A2 | 9/2002 |
| WO | 2004060744 A1 | 7/2004 |

OTHER PUBLICATIONS

Messinger: "Remote control" Unmanned Systems, Washington, DC, vol. 12, No. 3, Jan. 1, 1994, pp. 31-32, XP000912240.

*Primary Examiner* — Khoi Tran
*Assistant Examiner* — Robert Nguyen
(74) *Attorney, Agent, or Firm* — Laurence A. Greenberg; Werner H. Stemer; Ralph E. Locher

(57) ABSTRACT

The invention relates to an automatic takeoff method for an aircraft with a flexible airfoil, comprising a carriage suspended by rigging lines from an airfoil. According to said method: —said carriage is provided with an autopilot controlling actuators that control said rigging lines; —said airfoil is provided with an airfoil attitude sensor, comprising a biaxial accelerometer and a biaxial rate gyro, capable of defining the position of an airfoil reference frame in relation to the ground, and means for communicating with said autopilot; —during takeoff, information is received from said airfoil attitude sensor and transmitted to said autopilot for the purpose of controlling said actuators. The invention also relates to an airfoil for the implementation of said method, comprising an airfoil attitude sensor with an inertial unit with a biaxial accelerometer and a biaxial rate gyro, and means for communicating with an autopilot. The invention further relates to an aircraft comprising such an airfoil.

13 Claims, 1 Drawing Sheet

(56) References Cited

U.S. PATENT DOCUMENTS

| | | | |
|---|---|---|---|
| 8,052,091 B2* | 11/2011 | Hansson et al. | 244/151 B |
| 8,209,068 B2* | 6/2012 | Vos et al. | 701/8 |
| 2002/0190157 A1 | 12/2002 | Asseline et al. | |
| 2002/0193914 A1* | 12/2002 | Talbert et al. | 701/3 |
| 2008/0077284 A1* | 3/2008 | Swope | 701/5 |
| 2008/0255715 A1* | 10/2008 | Elchynski | 701/16 |
| 2010/0295303 A1* | 11/2010 | Lind et al. | 290/44 |

* cited by examiner

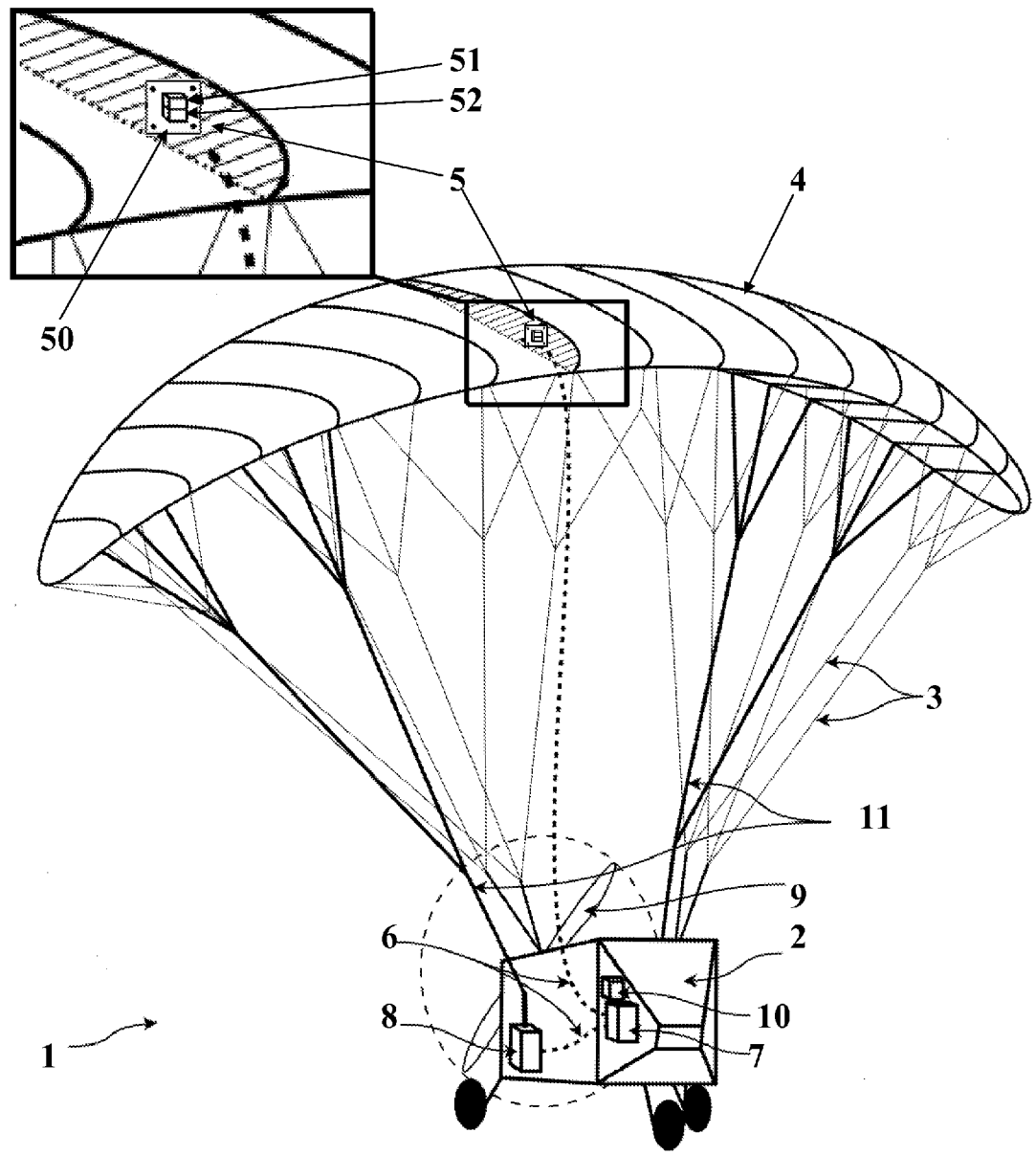

AUTOMATIC TAKEOFF METHOD FOR AN AIRCRAFT WITH A FLEXIBLE AIRFOIL, AND AIRFOIL AND AIRCRAFT

BACKGROUND OF THE INVENTION

Field of the Invention

The invention relates to a method of automatic takeoff management for a flexible-airfoil drone or aircraft comprising at least one sail, which comprises at least one carriage or harness suspended by suspension lines from at least said sail.

The invention further relates to a sail for the implementation of this method.

The invention further relates to a flexible-airfoil drone or aircraft, which comprises at least one carriage or harness suspended by suspension lines from at least one such sail, said carriage or harness comprising an autopilot designed to be able to give orders to actuators that said drone or aircraft comprises so as to act on said suspension lines, or/and to act on engine means or/and to act on control surfaces.

The invention relates to the field of flexible-airfoil aircraft, comprising a harness or a carriage, hereinafter termed carriage, for carrying loads or/and persons, which carriage is suspended under a lifting flexible airfoil, analogous to a paraglider wing, hereinafter dubbed sail, and preferably comprising engine means. A flexible airfoil then affords great safety in case of failure of the engine means.

Such an aircraft is known through the document W093/01087.

A flexible-airfoil drone or aircraft, especially motorized, is able to fulfill missions of various kinds, such as transport of persons, of hardware, assistance at sea, observation and monitoring of the ground, fires, borders, traffic, aerial photography, gathering of samples, measurements of physical quantities, meteorology, intervention in polluted or contaminated zones, aerial work, parachuting, drops, military or similar applications. Such an aircraft, usable with or without a pilot, is very advantageous, highly autonomous, has a very low cost per kilo transported and a large carrying capacity.

Pilotless use makes it possible to increase the payload. The aircraft then exhibits very particular advantages, and is in particular suitable for transporting dangerous materials, especially fuels, for the replenishment of forward or similar assistance posts. In the same manner, it may be used in polluted or irradiated zones, for example for gathering samples, taking photographs, measurements of physical quantities, or similar.

The ergonomics of piloting remains, however, a major concern in respect of flexible-airfoil aircraft, insofar as certain flight phases require a certain deftness on the part of the pilot, or of the tele-pilot if the aircraft is radio-controlled for example. Indeed, at least one tele-pilot is customarily indispensable for the takeoff of the craft, which is a tricky maneuver requiring a great deal of precision and experience. The presence thereof is desirable, for takeoff, on the strip from which the aircraft takes off.

Takeoff, and a fortiori automatic takeoff of a pilotless flexible-airfoil aircraft, or drone, is particularly tricky. Indeed the sail is designed to be able to be inflated by the relative wind which creates the lift necessary for carrying a load, consisting of the carriage, suspended under this sail by virtue of suspension lines. This carriage can move on the ground by rolling or sliding or similar, is designed to be able to carry a payload, and has tractive or propulsive means, especially an engine, making it possible to create the energy necessary for sustaining flight or/and for takeoff. The inflation of the sail may be achieved through ancillary means such as a fan, or else a slope. However, the genuine autonomy of such a drone or aircraft requires that it comprise motorization means.

Usually, to make a flexible-airfoil drone or aircraft take off, the sail is disposed on the ground behind the carriage, the engine is started up, and accelerated. The relative wind thus created inflates the sail, which is positioned above the carriage. After a few meters of rolling the whole assembly can take off. In a variant, the carriage is driven by tractive or propulsive means, such as a winch or similar, thereby making it possible to unfurl the sail and to hoist it above the carriage.

In reality, while the carriage is accelerating, an uncontrolled wing behaves in an anarchic manner, and is subjected to swaying which becomes amplified, lockups, changes of direction, amongst other malfunctions, which run the risk of causing the carriage to overturn, or else a swaying motion which may lead to the destruction of the craft. Likewise, in the case of strong sidewind, the inflation of the sail is disturbed, thereby resulting in the offsetting of the sail with respect to the carriage. Roll and pitch phenomena render the aircraft difficult to control and may cause takeoff to fail. If the takeoff maneuver is made by telecontrol, the associated delay as well as poor anticipation of the tele-pilot may amplify the swaying phenomenon.

In the most advanced versions of craft, to allow automated operation, the carriage is furnished with one or more attitude sensors and probes such as magnetometers, telemeters, sensors for dynamic and static measurement of the pressure, "GPS", or similar. These sensors and probes inform an automatic pilot termed the autopilot, which is designed to be able to give orders to actuators which direct the flight controls, especially controls of the propulsive or tractive engine means on the one hand, and on the other hand controls acting on the suspension lines, such as rams, winders, airfoil brakes or similar. An attitude sensor on board the carriage, which comprises sensors such as inclinometers or similar for measuring the angles or/and speeds of displacement between the axes of the carriage and an absolute ground benchmark, will be called a carriage attitude sensor in the subsequent description.

The known flexible-airfoil aircraft may not use the carriage attitude sensor of the carriage to intervene on the takeoff parameters. Indeed, the difficulty with this type of aircraft is that, during the whole of the phase of inflation, of rising of the sail above the carriage, of positioning of the sail vertically in line with the carriage, and of rolling or sliding, the carriage which contains the attitude sensors does not fly, whereas the wing, however, is already in flight. The carriage's attitude sensors may not therefore describe the operation of the sail.

BRIEF SUMMARY OF THE INVENTION

The invention proposes to solve this problem by enabling automatic takeoff, in complete reliability, and without requiring the skill of a pilot aboard or on the takeoff site. The invention endeavors to develop a method for synchronous takeoff management, or at least with very fast reaction, with respect to the motions of the sail in relation to a ground benchmark.

The invention further proposes to make it easier to employ flexible-airfoil aircraft, by permitting completely automatic takeoffs.

For this purpose, the invention relates to a method of automatic takeoff management for a flexible-airfoil drone or aircraft comprising at least one sail, which comprises at least one carriage or harness suspended by suspension lines from at least said sail, said method being characterized in that:

said carriage or harness is equipped with at least one autopilot designed to be able to give motion orders to actuators with which said drone or aircraft is equipped so as to act at least on said suspension lines;

said sail is equipped with at least one airfoil attitude sensor, comprising at least one accelerometer on at least two axes and at least one gyrometer on at least two axes, designed to be able to define the position of a so-called sail benchmark with respect to a ground benchmark, as well as means of communication with said autopilot;

at least during the takeoff of said drone or aircraft, information originating from said airfoil attitude sensor is recovered and communicated to said autopilot so as to give orders to said actuators.

The invention further relates to a sail for the implementation of this method, characterized in that it comprises at least one airfoil attitude sensor itself comprising an onboard inertial platform equipped with at least one accelerometer on at least two axes and with at least one gyrometer on at least two axes, and in that it further comprises means of communication with an autopilot.

The invention further relates to a flexible-airfoil drone or aircraft, which comprises at least one carriage or harness suspended by suspension lines from at least one sail as claimed in the preceding claim, said carriage or harness comprising said autopilot designed to be able to give orders to actuators that said drone or aircraft comprises so as to act on said suspension lines, or/and to act on engine means or/and to act on control surfaces, characterized in that said communication means are designed to be able to transmit information originating from said airfoil attitude sensor so as to communicate said information to said autopilot so as to give orders to said actuators.

The invention comprises software for managing the takeoff parameters to ensure safe and stable takeoff, by virtue of the use of an inertial platform. This control of the parameters provides the pilot with valuable assistance. It also makes it possible to dispense with a pilot.

Other advantages of the invention will become apparent on reading the description which follows, setting forth a nonlimiting embodiment of the invention.

DESCRIPTION OF THE INVENTION

The invention relates to the automation of the takeoff of a flexible-airfoil drone or aircraft, which will be designated hereinafter as aircraft. The latter comprises at least one carriage or harness, hereinafter designated as carriage, suspended by suspension lines from at least one sail. This carriage comprises an autopilot designed to be able to give orders to various actuators.

The autopilot is a computer equipped with software which is designed to be able to process signals from sensors, in particular accelerometers, magnetometers, and gyroscopes originating from at least one inertial platform, positioning signals arising from a "GPS", as well as signals emanating from other sensors such as altimeter, variometer, fuel gauge, tachymeter, or other conventional onboard aeronautical instruments, especially engine data, or else signals emanating from vision element, or radar, or similar. The software is therefore implemented to process physical quantities which are signals and measurements, compare them with setpoints, and generate signals for the control of actuators such as servo-controls, rams, and the like. These actuators are designed to be able to act on the suspension lines, as well as on the engine means if the aircraft comprises same, and on other means such as means of steering, of airfoil braking, of flight control, control surfaces, or similar.

The takeoff management method according to the invention implements such an autopilot, the object of which is to manage these actuators, so as to act in a suitable manner on the flight controls at least in the takeoff phase, or indeed on other flight phases.

According to the invention, the method of automatic takeoff management for a flexible-airfoil drone or aircraft comprising at least one sail, which comprises at least one carriage or harness suspended by suspension lines from at least this sail, consists in carrying out the following operations:

said carriage or harness is equipped with at least one autopilot designed to be able to give motion orders to actuators with which said drone or aircraft is equipped so as to act at least on said suspension lines;

said sail is equipped with at least one airfoil attitude sensor, comprising at least one accelerometer on at least two axes and at least one gyrometer on at least two axes, designed to be able to define the position of a so-called sail benchmark with respect to a ground benchmark, as well as means of communication with said autopilot;

at least during the takeoff of said drone or aircraft, information originating from said airfoil attitude sensor is recovered and communicated to said autopilot so as to give orders to said actuators.

According to the invention, the sail designed for the implementation of this method comprises at least one airfoil attitude sensor itself comprising an onboard inertial platform equipped with at least one accelerometer on at least two axes and with at least one gyrometer on at least two axes, and in that it further comprises means of communication with an autopilot.

The system of axes comprises a first axis, preferably along the direction of gravity, and two other axes preferably horizontal, which are not merged together. In a manner which is preferred for the simplification of the computations, but which is in no way compulsory, the three axes of the system of axes are chosen mutually orthogonal. It is understood that, in a manner which is preferred but in no way compulsory, the two axes according to which the signals of the accelerometer and those of the gyrometer are gathered are the same. The inertial platform is then equipped with at least one accelerometer on at least two axes and with at least one gyrometer on at least said same two axes.

In a particular embodiment, the sail is equipped with at least one airfoil attitude sensor comprising at least one accelerometer on three axes and at least one gyrometer on three axes, designed to be able to define the position of a sail benchmark with respect to a ground benchmark, as well as means of communication with the autopilot.

The airfoil attitude sensor is preferably installed in the very heart of the sail, is therefore designed to be both light and strong, and is fitted with at least one accelerometer according to at least two axes, and with at least one gyrometer according to at least two axes, preferably the same as those of the accelerometer. The airfoil attitude sensor dispatches, by communication means such as a "Blue Tooth" transmitter, or by another radio frequency, or by wire, information as raw data regarding the attitude of the sail during the phases of inflation of the sail, of positioning of the sail above the carriage, and of rolling until takeoff. Naturally, it can dispatch information of the same type during any flight phase, if so desired.

To allow the implementation of the method according to the invention, the communication means are designed to be able to transmit information originating from the airfoil attitude sensor so as to communicate said information to the autopilot so as to give orders to the actuators.

According to the invention, raw inertial measurements are transmitted, from said airfoil attitude sensor to said autopilot, which processes them by estimating in an optimal manner the attitude and the angular speeds of said sail, by integration of the angular speeds provided by said gyrometer or gyrometers and determination of the direction of gravity according to the measurements of said accelerometer or accelerometers.

These raw data are filtered so as to model the errors and the uncertainties of the sensors. The values after filtering are dispatched to the autopilot which interprets them and gives the appropriate orders to the actuators, which act on the flight controls.

The autopilot is also designed to be able to control actuators that said drone or aircraft comprises so as to act on internal engine means when the aircraft comprises same, or/and to act on control surfaces when the aircraft comprises same.

According to the case, the aircraft comprises internal engine means designed to be able to allow its takeoff, or/and means of linking to external engine means designed to be able to allow its takeoff such as a winch or similar. The actuators are then designed to be able to control the engine means, internal or/and external, as the case may be.

In a particular embodiment, the aircraft further comprises means of steering, or/and of airfoil braking, or/and of flight control, or/and control surfaces, that the actuators are designed to be able to control. The autopilot is then designed to be able to control means of steering, or/and of airfoil braking, or/and of flight control, or/and control surfaces, when the aircraft comprises same.

The management of the tractive or propulsive means, especially of the gases of an engine, or else of the output of an electric motor, or similar, is then likewise automatic. Therefore, it suffices for the pilot, for the operator, or for the tele-pilot, to actuate a trigger such as a control button or the like, constituting the transmission means, to put the aircraft into the air.

The airfoil attitude sensor comprises at least one inertial platform "IMU", or Inertial Measurement Unit, preferably based on "MEMS" technology using 3-axis accelerometers and 3-axis gyrometers. This inertial platform is associated with a communication module. The communication can equally well be carried out wirelessly or by wire. The inertial platform thus transmits raw inertial measurements to the autopilot, which, on the basis of said measurements, estimates in an optimal manner the attitude of the sail and its angular speeds.

"MEMS" technology is preferred, since it allows the miniaturization, both as regards size and weight, of the airfoil attitude sensor, this being desirable so as not to modify the profile of the sail and disturb the latter in flight.

The autopilot implements dedicated software, which estimates the attitude of the sail by integration of the angular speeds provided by the gyrometer or gyrometers on at least two axes, or else on the 3 axes of the chosen system of axes. The accelerometer or accelerometers allow the determination of the direction of gravity, thus providing a stable reference. The software undertakes the filtering of these data, so as to determine an optimal estimation of the attitude and rotation speeds. It also carries out a calibration of the inertial measurements, by estimating the biases and scale factors for each of the probes.

For this purpose, the autopilot is piloted by a finite element integration program so as to compute the values of the orders given to the actuators, said program being based on the theory of Euler angles, or the theory of quaternions, or the theory of direction cosines.

On the basis of these measurements, the autopilot determines the appropriate controls that should be dispatched to the actuators, especially to the rams of the sail's airfoil brakes, so as to reset the sail to an angular position that can allow takeoff. The computation of the controls of the rams advantageously takes account of the speed of displacement of the carriage. Indeed, the higher the speed of the carriage, the more finely the sail should be piloted.

In order to circumvent the inevitable mathematical singularities related to the definition of the attitude in dimension three, the filter developed relies preferably on the group of the quaternions. This mathematical tool is chosen since it makes it possible to have better stability in the numerical computations.

The integration of an inertial platform within the sail makes it possible to precisely determine its position, and its angular speed as regards pitch and roll.

The autopilot can then equally well control the maneuvers to be performed on the elevators and the sail, and the maneuvers to be performed on the motorization means, as well as on means for directing the carriage, such as steering means. The autopilot can also display the maneuvers or corrections to be performed for a pilot present on board. But, preferably, any disturbance-generating human control should be avoided. The implementation of the invention makes it possible to continuously perform the recentering of the sail in relation to the ground, and thus permits optimal takeoff.

The control principles are as follows:
- if the sail is off-centered, an airfoil braking order is dispatched to the airfoil brake situated on the opposite side;
- if the sail tends to deviate from its ideal position, an appropriate correction order is dispatched to the controls. This holds equally well for the flight phases and for the takeoff phase;
- in case of pitching, a combined action on the airfoil brakes makes it possible to control the position;
- if the sail and the carriage are not centered one under the other, a rotation order is addressed to the steerable wheel.

The autopilot is in particular able, if appropriate, to act on control surfaces that the aircraft can comprise, for example at the level of empennages added on to the carriage, or similar.

It is understood that the combination of all these actions tends to reproduce the actions that a human pilot would do.

In a particular variant, the carriage comprises at least one carriage attitude sensor designed to be able to define the position of a carriage benchmark with respect to a ground benchmark, and further comprising an autopilot designed to be able to give orders to actuators that this aircraft comprises so as to act on these suspension lines. In this variant, the autopilot is designed to be able to cut off, under the effect of an action on transmission means, the information given by the carriage attitude sensor, and to replace said information with that given by an airfoil attitude sensor inserted into the sail itself, so as to deliver orders to the actuators.

For this purpose, the aircraft further comprises a switching means designed to be able to give the airfoil attitude sensor priority over the carriage attitude sensor so as to inform the autopilot and generate the commands dispatched by the latter to the actuators.

The method of automatic takeoff management is then supplemented with the following steps:
- said carriage or harness is equipped with at least one carriage attitude sensor designed to be able to define the position of a so-called carriage benchmark with respect to a ground benchmark;

at least during the takeoff of said drone or aircraft, a switching means is used to give precedence to the airfoil attitude sensor over the carriage attitude sensor so as to communicate with the autopilot to give orders to the actuators.

It is understood that, in the case where the sail is equipped with several airfoil attitude sensors, especially for safety, or/and where the carriage is equipped with several autopilots, rules of priority are defined to give priority to one airfoil attitude sensor over the others, or/and to one autopilot over the others, the aircraft then being equipped with management and transmission means so as to apply the implementation of these priorities.

The implementation of the invention, in its various forms, makes it possible to maintain the sail and the carriage under one another, in the ground phases and also in the in-flight phases. The autopilot is especially able to verify the relative position of the center of inertia of the carriage with respect to the center of thrust of the sail.

The automatic takeoff method according to the invention further allows, insofar as it makes it possible to circumvent the presence of a pilot, use in cases presumed to be dangerous, especially paraglider or paramotor sail tests. Indeed, big advantages with respect to human piloting are available: repeatability of the actions on the controls, possible recording of the flight parameters and associated actions and therefore capability for a-posteriori analysis, mass of the aircraft easily adjustable, elimination of the risk of bodily accident, in-flight trials in any terrain.

In all, the invention permits fully automatic takeoff of an ad-hoc equipped flexible-airfoil aircraft, under excellent safety conditions, and for a modest cost.

BRIEF DESCRIPTION OF THE FIGURE OF THE DRAWING

The FIGURE of the Drawing is a perspective view of the aircraft with the flexible airfoil/sail.

DESCRIPTION OF THE INVENTION

The invention concerns a flexible-airfoil drone or aircraft 1, which includes at least one carriage or harness 2 suspended by suspension lines 3 from at least one sail 4.

The sail 4 includes at least one airfoil attitude sensor 5 having an onboard inertial platform 50 equipped with at least one accelerometer 51 on at least two axes and with at least one gyrometer 52 on at least two axes. The sail 4 includes communication means 6 with an autopilot 7.

The carriage or harness 2 includes the autopilot 5 that is constructed to be able to give orders to actuators 8 that the drone or aircraft 1 includes so as to act on the suspension lines 4, or/and to act on engine means 9 and/or to act on control surfaces. The communication means 6 are constructed to be able to transmit information originating from the airfoil attitude sensor 5 so as to communicate the information to the autopilot 7 so as to give orders to the actuators 8.

The carriage or harness 2 includes a carriage attitude sensor 10 constructed to be able to define the position of a carriage benchmark with respect to a ground benchmark. The drone or aircraft 1 further includes a switching means constructed to be able to give the airfoil attitude sensor 5 priority over the carriage attitude sensor 10 so as to inform the autopilot 7 and generate the commands dispatched by the latter to the actuators.

The flexible-airfoil drone or aircraft 1 also includes internal engine means 9 constructed to be able to allow its takeoff, or/and means of linking to external engine means designed to be able to allow its takeoff such as a winch or similar, and that said actuators 8 are constructed to be able to control said engine means 9.

The flexible-airfoil drone or aircraft 1 further includes control surfaces, and/or means of steering 11, and/or of airfoil braking, and/or of flight control, that the actuators 8 are constructed to be able to control.

The invention claimed is:

1. A method of automatic takeoff management for a flexible-airfoil drone or aircraft having at least one sail and at least one carriage or harness suspended by suspension lines at least from the at least one sail, the method comprising:
   equipping the at least one carriage or harness with at least one autopilot constructed for giving motion orders to actuators with which the drone or aircraft is equipped, acting at least on the suspension lines with the actuators during the takeoff;
   equipping the at least one sail with at least one airfoil attitude sensor having at least one accelerometer on at least two axes and at least one gyrometer on at least two axes, and being constructed for being able to define a position of a sail benchmark with respect to a ground benchmark, the at least one airfoil attitude sensor having means of communication with the at least one autopilot;
   at least during the takeoff of the drone or aircraft, recovering information originating from the at least one airfoil attitude sensor and communicating the information to the at least one autopilot so as to give orders to the actuators.

2. The method as claimed in claim 1, further comprising transmitting raw inertial measurements from the at least one airfoil attitude sensor to the at least one autopilot, processing the raw inertial measurements by estimating the attitude and the angular speeds of the at least one sail, by integration of the angular speeds provided by the gyrometer or gyrometers and determination of the direction of gravity according to the measurements of the accelerometer or accelerometers.

3. The method as claimed in claim 1, further comprising piloting the at least one autopilot by a finite element integration program for computing the values of the orders given to the actuators, the program being based on the theory of Euler angles, or the theory of quaternions, or the theory of direction cosines.

4. The method as claimed in claim 1, further comprising making the at least one autopilot control the actuators so as to act on internal engine means of the drone or aircraft or/and so as to act on control surfaces of the drone or aircraft.

5. The method as claimed in claim 1, further comprising making the at least one autopilot control means of steering, or/and of airfoil braking, or/and of flight control, or/and control surfaces of the drone or aircraft.

6. The method as claimed in claim 1, further comprising:
   equipping the at least one carriage or harness with at least one carriage attitude sensor constructed for being able to define the position of a carriage benchmark with respect to a ground benchmark;
   at least during the takeoff of the drone or aircraft, using a switching means for giving precedence to the at least one airfoil attitude sensor over the at least one carriage attitude sensor so as to communicate with the at least one autopilot for giving orders to the actuators.

7. The method as claimed in claim 1, further comprising:
   equipping the at least one sail with at least one airfoil attitude sensor having at least one accelerometer on three axes and at least one gyrometer on three axes, and being constructed for being able to define the position of a sail benchmark with respect to a ground benchmark, as well as means of communication with the at least one autopilot.

8. A sail for the implementation of the method according to claim 1, the sail comprising: at least one airfoil attitude sensor having an onboard inertial platform equipped with at least one accelerometer on at least two axes and with at least one gyrometer on at least two axes, and means of communication with an autopilot.

9. A flexible-airfoil drone or aircraft, which comprises at least one carriage or harness suspended by suspension lines from at least one sail as claimed in claim 8, said at least one carriage or harness including said autopilot, said autopilot configured for giving orders to actuators to act on said suspension lines, or/and to act on engine means or/and to act on control surfaces, said communication means being configured for transmitting information originating from said at least one airfoil attitude sensor so as to communicate said information to said autopilot for giving orders to said actuators.

10. The flexible-airfoil drone or aircraft as claimed in claim 9, further comprising internal engine means constructed for allowing takeoff, or/and means of linking to external engine means constructed for allowing takeoff such as a winch or similar, and that said actuators are constructed for controlling said engine means, internal or/and external, as the case may be.

11. The flexible-airfoil drone or aircraft as claimed in claim 9, further comprising control surfaces, or/and means of steering, or/and of airfoil braking, or/and of flight control, that said actuators are constructed to control.

12. The flexible-airfoil drone or aircraft as claimed in claim 9, wherein said at least one carriage or harness includes a carriage attitude sensor constructed to be able to define the position of a carriage benchmark with respect to a ground benchmark, a switching means constructed for giving said at least one airfoil attitude sensor priority over said carriage attitude sensor so as to inform said autopilot and generate the commands dispatched by the latter to said actuators.

13. A sail comprising:

suspension lines, actuators connected to said suspension lines, and at least one airfoil attitude sensor mounted on the sail, said at least one airfoil attitude sensor having an onboard inertial platform equipped with at least one accelerometer on at least two axes and with at least one gyrometer on at least two axes, and means of communication with an autopilot, said airfoil attitude sensor configured for communicating information obtained by said airfoil attitude sensor during takeoff for actuating said suspension lines.

* * * * *